United States Patent [19]

Hicks et al.

[11] Patent Number: 4,516,638
[45] Date of Patent: May 14, 1985

[54] SOIL AERATING APPARATUS WITH HYDRAULIC VALVE ARRANGEMENT

[75] Inventors: John E. Hicks; James J. Kubat, both of Lincoln, Nebr.

[73] Assignee: Outboard Marine Corporation, Waukegan, Ill.

[21] Appl. No.: 497,747

[22] Filed: May 25, 1983

[51] Int. Cl.³ .................. A01B 45/02; F16K 31/28
[52] U.S. Cl. ........................ 172/22; 91/437;
91/464; 251/101; 251/110; 137/270; 137/625.69
[58] Field of Search ............ 172/21, 22, 4; 137/270, 137/383, 384, 625.69; 91/437, 464; 251/101, 102, 103, 104, 105, 106, 110

[56] References Cited

U.S. PATENT DOCUMENTS

| | | | |
|---|---|---|---|
| 1,764,963 | 6/1930 | Laster | 404/124 |
| 2,700,984 | 2/1955 | Gleasman | 251/102 X |
| 2,916,050 | 12/1959 | Ruhl | 91/437 X |
| 3,228,415 | 1/1966 | Geiss | 251/101 |
| 3,346,012 | 10/1967 | Williams | 91/464 X |
| 3,677,281 | 7/1972 | Tennis | 137/270 |
| 3,903,623 | 9/1975 | Hyler | 172/4 |
| 4,081,034 | 3/1978 | Hines | 172/22 |
| 4,158,391 | 6/1979 | Clements | 172/22 |

Primary Examiner—Richard J. Johnson
Attorney, Agent, or Firm—Michael, Best & Friedrich

[57] ABSTRACT

A soil aerating apparatus comprising a towing vehicle, a soil aerating device comprising a drum, tines extending radially from the drum, and a frame for supporting the drum for rotation about a horizontal axis. The frame includes a forward end with a draw arm, and the forward end is pivotally attached to the towing vehicle so that the frame is raised and lowered by moving the draw arm. The apparatus also includes a mechanism for moving the draw arm comprising a hydraulic cylinder including a piston rod and connected between the draw arm and the towing vehicle, and a valve operably connected to the cylinder for extending and retracting said piston rod. The valve includes a valve member movable between a position wherein the valve extends the piston rod, a position wherein the valve holds the piston rod in a fixed position, a position wherein the valve retracts the piston rod, and a position wherein the valve permits the piston rod to extend or retract in response to movement of the draw arm. The apparatus also includes a mechanism for moving the valve member. The mechanism includes a lever pivotally connected to the valve member and pivotally mounted for movement between four positions corresponding to the valve member positions. The mechanism for moving the draw arm also includes a mechanism for releasably securing the lever in the position where the piston rod is free to move.

10 Claims, 9 Drawing Figures

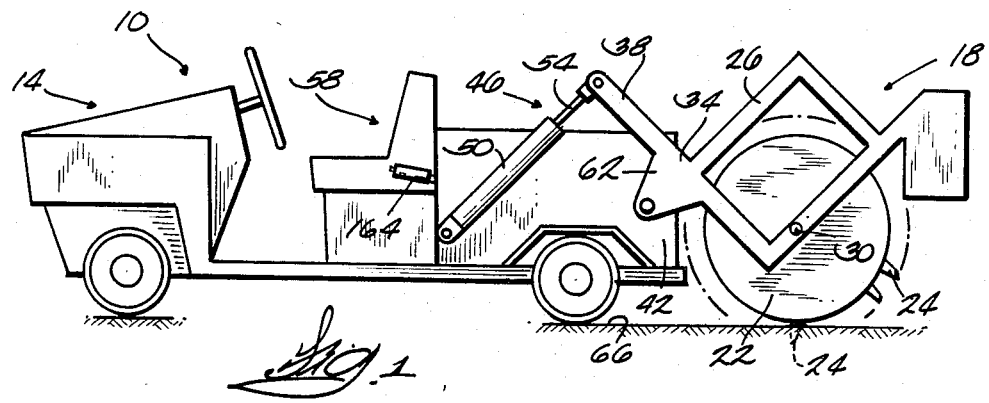
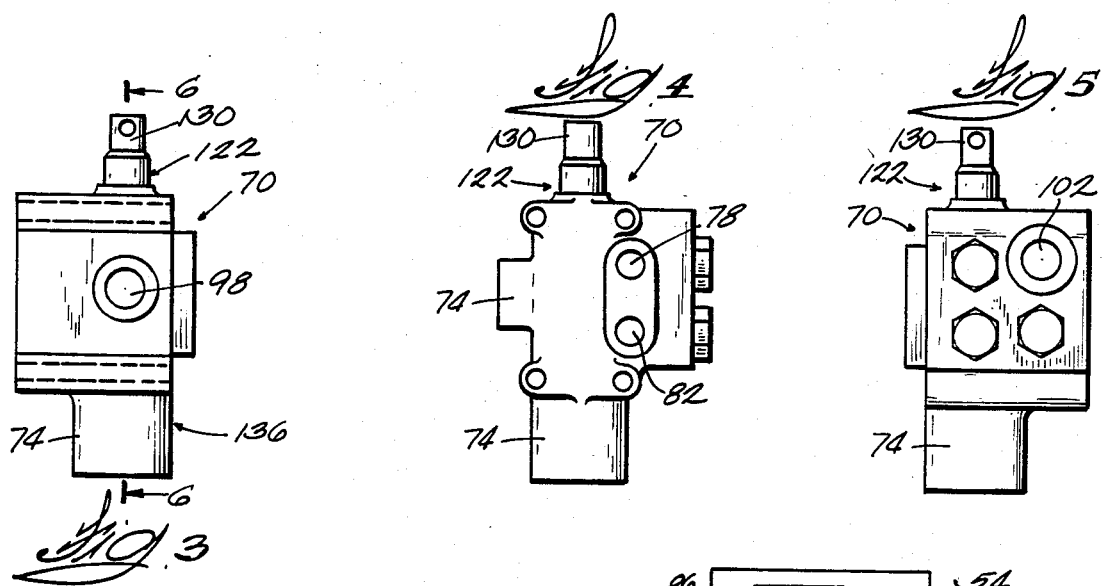
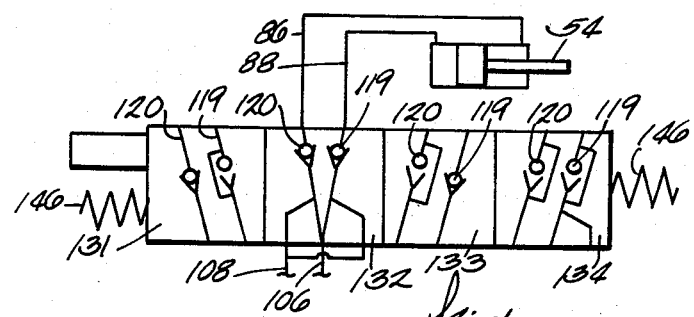
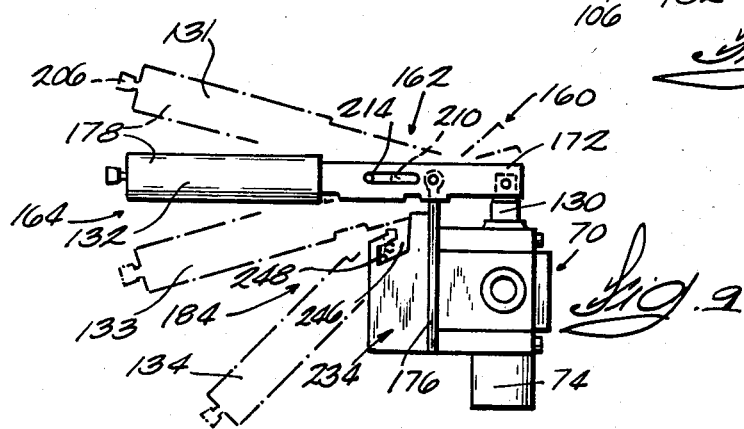

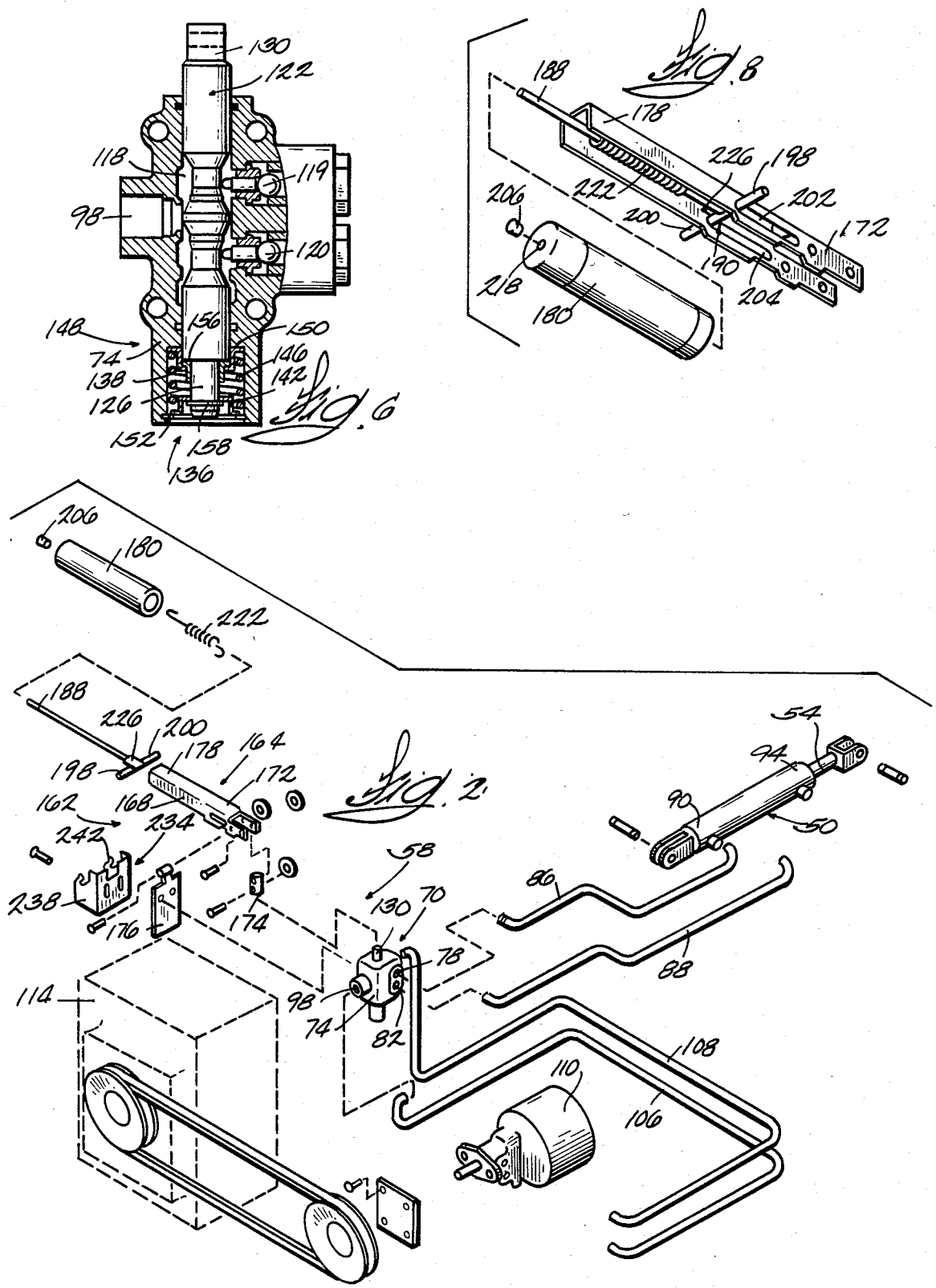

SOIL AERATING APPARATUS WITH HYDRAULIC VALVE ARRANGEMENT

BACKGROUND AND SUMMARY OF THE INVENTION

This invention relates to hydraulic valve arrangements including a valve adapted to be operably connected to a hydraulic cylinder including a piston rod. The valve includes a valve member movable between at least a neutral position wherein the piston rod is in a fixed position, and a float position wherein the piston rod can move freely.

The invention also relates to soil aerating apparatuses including a towing vehicle and a soil aerating device which includes a drum with tines extending radially from the drum and a control for letting the tines float with the contour of the soil.

Attention is directed to Tennis U.S. Pat. No. 3,677,281 issued July 18, 1972 which discloses a valve with a valve member movable between at least a neutral position and a float position.

This invention provides a hydraulic valve arrangement comprising valve means adapted to be operably connected to a hydraulic cylinder including a piston rod. The valve means includes a valve member movable between at least a neutral position wherein the piston rod is in a fixed position, and a float position wherein the piston rod can move freely. The valve means also includes means for biasing the valve member towards the neutral position. The valve arrangement also includes means for moving the valve member between the valve member positions. The moving means comprises a lever connected to the valve member and pivotally mounted for movement between positions corresponding to the valve member positions. The valve arrangement also includes means for releasably securing the lever in the float position and for selectively preventing and permitting movement of the lever toward the float position wherein the piston rod can move freely.

In one embodiment, the means for releasably securing the lever in the float position comprises a projection on the lever, means for moving the projection between a first position and a second position, and a latch bracket secured adjacent the lever and including an opening disposed so that when the lever is in the float position, the opening receives the projection when in the first position, and the latch bracket holds the projection when in the second position. The projection moves along the lever, and the latch bracket includes a side adjacent the lever. The opening comprises a slot extending from the side.

This invention also provides a soil aerating apparatus comprising a towing vehicle, a soil aerating device comprising a drum, tines extending radially from the drum, and frame means for supporting the drum for rotation about a horizontal axis. The frame means includes a forward end with a draw arm and the forward end is pivotally attached to the towing vehicle so that the frame means is raised and lowered by moving the draw arm. The apparatus also includes means for moving the draw arm. The moving means comprises a hydraulic cylinder including a piston rod. The hydraulic cylinder is connected between the draw arm and the towing vehicle, and the moving means further includes valve means operably connected to the cylinder for extending and retracting the piston rod. The valve means includes a valve member movable between a position wherein the valve means extends the piston rod, a position wherein the valve means holds the piston rod in a fixed position, a position wherein the valve means retracts the piston rod, and a position wherein the valve means permits the piston rod to extend or retract in response to movement of the draw arm.

One of the principal features of this invention is the provision of a valve arrangement including a valve adapted to be operably connected to a hydraulic cylinder including a piston rod. The valve includes a valve member movable between at least a neutral position where the piston rod is in a fixed position and a float position where the piston rod can move freely.

Another of the principal features of the invention is the provision of such a valve arrangement for use with a soil aerating apparatus with a towing vehicle and a soil aerating device. Such a valve arrangement would provide for free floating of the soil aerating device as the contour of the soil changes.

Another of the principal features of the invention is the provision of such a valve arrangement which selectively permits and prevents movement of the valve member into the float position.

Another of the principal features of the invention is the provision of such a valve arrangement which also releasably secures the valve member in the float position.

BRIEF DESCRIPTION OF THE DRAWINGS

FIG. 1 is a side view of a soil aerating apparatus embodying various of the features of the invention.

FIG. 2 is an exploded view of a hydraulic valve arrangement for raising and lowering the soil aerating device attached to the rear of the towing vehicle shown in FIG. 1.

FIG. 3 is a side view of the valve shown in FIG. 2.

FIG. 4 is another side view of the valve shown in FIG. 2.

FIG. 5 is another side view of the valve shown in FIG. 2.

FIG. 6 is a partial cross-sectional view taken along the lines 6—6 in FIG. 3.

FIG. 7 is a schematic representation of the various operating positions of the valve shown in FIG. 6.

FIG. 8 is an exploded view of a handle for operating the valve shown in FIG. 2.

FIG. 9 is a side view of a valve arrangement embodying various of the features of the invention.

Before explaining at least one embodiment of the invention in detail, it is to be understood that the invention is not limited in its application to the details of construction and the arrangements of the components set forth in the following description or illustrated in the drawings. The invention is capable of other embodiments and of being practiced or carried out in various ways. Also, it is to be understood that the phraseology and terminology employed herein is for the purposes of description and should not be regarded as limiting.

DESCRIPTION OF THE PREFERRED EMBODIMENT

Shown in FIG. 1 is a soil aerating apparatus 10 comprising a towing vehicle 14 and a soil aerating device 18. The soil aerating device 18 includes a drum 22, tines 24 extending radially from the drum 22 and frame means in the form of a frame 26 for supporting the drum 22 for rotation about a horizontal axis 30. The frame 26 includes a forward end 34 with a draw arm 38. The forward end 34 of the frame 26 is pivotally mounted on the rear 42 of the towing vehicle 14 so that the frame 26, including the drum 22, is raised or lowered by moving the draw arm 38.

The apparatus 10 also includes means 46 for moving the draw arm 38 to raise and lower the frame 26. The moving means 46 comprises a hydraulic cylinder 50 which includes a piston rod 54 and which is connected between the draw arm 38 and the rear 42 of the towing vehicle 14, together with means 58 for extending and retracting the piston rod 54. As the piston rod 54 extends and retracts, the draw arm 38 rotates the frame 26 about the point of pivotal attachment 62 to the towing vehicle 14. In this manner, the soil aerating device 18 can be raised when the apparatus operator does not wish to aerate soil and can be lowered onto the soil when the operator so wishes.

As illustrated in FIGS. 2 and 4, the means 58 for extending and retracting the piston rod 54 includes valve means 70 comprising a valve body 74. The valve body 74 includes a first cylinder port 78 and a second cylinder port 82 operably connected by the conduits 86 and 88 to the cylinder 50. One conduit 86 is connected to the first cylinder port 78 and one end 90 of the hydraulic cylinder 50 and the other conduit 88 is connected to the second cylinder port 82 and the other end 94 of the hydraulic cylinder 50. As illustrated in FIGS. 2, 3 and 5, the valve body 74 also includes an inlet port 98 and an outlet port 102 connected, by conduits 106 and 108 respectively, to a hydraulic pump 110 driven by the engine 114 in the towing vehicle 14.

The cylinder ports 78 and 82 extend from a central chamber 118 in the valve body 74, as illustrated in FIG. 6, and respectively include flow control valves 119 and 120. The chamber 118 is also in communication with the inlet port 98 and outlet port 102. A spool valve or valve member 122 is slidably received in the central chamber 118 for operating the flow control valves 119 and 120 to place the various ports selectively in communication with one another. The spool valve 122 includes a first end 126 and a second end 130 which extends outside of the valve body 74.

More particularly, the spool valve 122 is movable between four consecutive positions, illustrated schematically in FIG. 7. In the second or neutral position 132, also illustrated in FIG. 6, the spool valve 122 isolates the cylinder ports 78 and 82 from each other and the remaining ports 82 and 122 thus securing the piston rod 54 in its then existing position. In the first position 131, the spool valve 122, as shown in FIG. 6, is displaced downwardly and opens the flow control valve 119 to cause the inlet port 98 to be in communication with the first cylinder port 78 and the second cylinder port 82 to be in communication with the outlet port 102 so that hydraulic fluid extends the piston rod 54. In the third position 133, the spool valve, as shown in FIG. 6, is displaced upwardly and opens the flow control valve 120 to cause the inlet port 98 to be in communication with the second cylinder port 82 and the first cylinder port 78 to be in communication with the outlet port 102, so that hydraulic fluid retracts the piston rod 54. In the fourth or floating position 134, the spool valve 122, as shown in FIG. 6, is again displaced upwardly opening flow control valves 119 and 120 so the first cylinder port 78 is in communication with the second cylinder port 82 so that the piston rod 54 can extend or retract freely in response to movement of the draw arm 38. In this floating position, the soil aerating device 18 is free to move with the contour of the soil 66.

As illustrated in FIG. 6, the valve means 70 also includes means 136 for biasing the spool valve 122 towards the neutral or second position 132. The biasing means 136 comprises a pair of annular brackets 138 and 142 adjacent the first end 126 of the spool valve 122, a spring 146 which is between the annular brackets 138 and 142 and which is concentric with the spool valve 122 and means 148 for compressing the spring 146 in response to spool valve movement away from the neutral or second position 132.

The annular brackets 138 and 142 are spaced-apart and extend radially from the spool valve 122. The compressing means 148 comprises fixed ridges 156 and 158 on the spool valve 122 outside of the spaced-apart brackets 138 and 142 for moving the corresponding bracket when the spool valve 122 is moved from the neutral position 132. The compressing means 148 also includes valve body shoulders 150 and 152 outside of the spaced-apart brackets 138 and 142 for preventing movement of the corresponding bracket when the spool valve 122 is displaced from the neutral position. When the spool valve 122 is moved from the neutral position 132 to one of the other positions, one of the spool valve ridges displaces the corresponding bracket and compresses the spring 146 against the other bracket held in position by the corresponding valve body shoulder. In this manner, the compressed spring 146 biases the spool valve 122 back towards the neutral position 132.

As illustrated in FIGS. 1, 2, 8 and 9, the apparatus 10 also includes a control arrangement 160 for operating the valve means 70. The control arrangement 160 includes means 162 for moving the spool valve 122 between the various operating positions. The means 162 for moving the spool valve 122 comprises a handle 164 which includes a channel piece or lever 168 with a first end 172 pivotally connected by link 174 to the second end 130 of the spool valve 122. The channel piece 168 is also pivotally mounted on a pivot plate 176 attached to the side of the valve body 74. The point of attachment of the channel piece 168 to the pivot plate 176 is offset from the first end 172 of the channel piece 168 so back and forth movement of the second end 178 of the channel piece 168 results in movement of the spool valve 122 between the various operating positions. The handle 164 also includes a rubber grip 180 on the second end 178 of channel piece 168.

As illustrated in FIGS. 2, 8 and 9, the control arrangement 160 also includes means 184 for releasably securing the handle 164 in the floating position 134 and for selectively permitting and preventing movement of the handle 164 to or toward the float position 134. The securing means comprises a push rod 188 centrally located within the elongated channel piece 168, and a cross bar or follower cam 190 which extends perpendicularly from the mid-section of the push rod 188. The follower cam 190 forms a pair of projections 198 and 200 which extend through elongated slots 202 and 204 in the sides of the channel piece 168. The push rod 188 also includes an end with a button 206 which extends from the second end 178 of the channel piece 168 to permit an operator to move the push rod 188 and projections 198 and 200 between first and second projection positions 210 and 214 respectively along the length of the channel piece 168. The button 206 extends through a hole 218 in the end of the rubber grip 180.

The securing means 184 also includes means for biasing the projections 198 and 200 towards the second end 178 of the channel piece 168, or the second projection position 214, after depression of the button 206 on the end of the push rod 188. The biasing means is in the form of a spring 222 concentric with the longitudinal axis of the push rod 188 and connected between the second end 178 of the channel piece 168 and the portion of the push rod 188 adjacent the follower cam 170. The push rod 188 includes a plate 226 adjacent the follower cam 170 for receiving the end of the spring 222.

The securing means 184 also includes a latch cam or bracket 234 which is secured adjacent the portion of the channel piece 168 with the projections 198 and 200. The bracket 234 is U-shaped and attached to the pivot plate 176 and includes sides 238 and 242 which extend perpendicularly from the pivot plate 176. The sides 238 and 242 are spaced apart so the channel piece 168 fits between the sides 238 and 242 of the bracket 234. Each of the sides 238 and 242 includes an opening or slot 246 for receiving the projections 198 and 200 when in the first projection position 210. As the handle 164 is moved toward the float position 134 and the button 206 is depressed so as to move the follower cam 190 along the channel piece 168 to the first projection position 210, the projection 198 and 200 enter the slots 246. As the button 206 is released and the projections 198 and 200 move in the opposite direction along the channel piece 168 to the second projection position 214, the projections 198 and 200 become secured in the angled portion 248 of the slots 246. In this manner, the handle 164 is secured in the float position 134 and held there until released by depressing the button 206 so as to move the projections 198 and 200 back to the first projection position 210 wherein the projections 198 and 200 can be removed from the slots 246.

When the button 206 is not depressed, the projections 198 and 200 are out of registry with the slot openings, and the handle 164 is prevented from being moved into the float position 134.

Various of the features of the invention are set forth in the following claims.

We claim:

1. A hydraulic valve arrangement comprising valve means adapted to be operably connected to a hydraulic cylinder including a piston rod, said valve means including a valve member movable between a first position wherein the piston rod is extended or retracted, a neutral position wherein the piston rod is in a fixed position, and a float position wherein the piston rod can move freely, means for biasing said valve member towards said neutral position, means for moving said valve member between said valve member positions comprising a lever operably connected to said valve member, and manual release means associated with said lever for permitting said lever to be moved between said first and neutral positions but positively preventing said lever from being accidentally moved to the float position until released and for selectively permitting said lever to be moved to said float position.

2. A hydraulic valve arrangement in accordance with claim 1 wherein said means associated with said lever is further operable to selectively releasably prevent said lever from being subsequently moved from said float position.

3. A hydraulic valve arrangement in accordance with claim 2 wherein said means associated with said lever comprises a projection on said lever, means for moving said projection between a first position and a second position, and a latch bracket adjacent said lever including a portion which is engaged by said projection and prevents movement of said lever to said float position when said projection is in said second position, said latch bracket further including an opening for receiving said projection and permitting said lever to be moved to said float position when said projection is in said first position and for releasably holding said lever in said float position when said projection is moved from said first position to said second position while in said opening.

4. A hydraulic valve arrangement in accordance with claim 3 including means for biasing said projection toward said second position.

5. A hydraulic valve arrangement in accordance with claim 3 wherein said projection moves along said lever, and wherein said latch bracket includes a side adjacent said lever, and wherein said opening comprises a slot extending from said side.

6. A soil aerating apparatus comprising a towing vehicle, a soil aerating device comprising a drum, tines extending radially from said drum, frame means supporting said drum for rotation about a horizontal axis and including a forward end having a draw arm, means pivotally attaching said forward end to said towing vehicle so that said frame means is raised and lowered by moving said draw arm, and means for moving said draw arm comprising a hydraulic cylinder including a piston rod and connected between said draw arm and said towing vehicle, and valve means operably connected to said cylinder for extending and retracting said piston rod, said valve means including a valve member movable between a first position wherein said valve means extends said piston rod, a second position wherein said valve means holds said piston rod in a fixed position, a third position wherein said valve means retracts said piston rod, and a fourth position wherein said valve means permits said piston rod to extend and retract in response to movement of said draw arm, a lever for moving said valve member between said positions, and manual release means associated with said lever for permitting said lever to be moved between said first, second and third positions but positively preventing said lever from being accidentally moved to said fourth position until released and for selectively permitting said lever to be moved to said fourth position.

7. A soil aerating apparatus in accordance with claim 6 wherein said means associated with said lever is further operable to selectively releasably prevent said lever from being subsequently moved from said fourth position.

8. A soil aerating apparatus in accordance with claim 7 wherein said means associated with said lever comprises a projection on said lever, means for moving said projection between a first position and a second position, and a latch bracket adjacent said lever including a portion which is engaged by said projection and prevents movement of said lever to said fourth position when said projection is in said second position, said latch bracket further including an opening for receiving said projection and permitting said lever to be moved to said fourth position when said projection is in said first position and for releasably holding said lever in said fourth position when said projection is moved from said first position to said second position while in said opening.

9. A soil aerating apparatus in accordance with claim 8 including means for biasing said projection toward said second position.

10. A soil aerating apparatus in accordance with claim 8 wherein said projection moves along said lever, and wherein said latch bracket includes a side adjacent said lever, and wherein said opening comprises a slot extending from said side.

* * * * *